United States Patent
Seo et al.

(10) Patent No.: US 12,024,653 B2
(45) Date of Patent: Jul. 2, 2024

(54) METHOD FOR PREPARING AQUEOUS PRESSURE-SENSITIVE ADHESIVE COMPOSITION FOR CLOTHING

(71) Applicant: LG Chem, Ltd., Seoul (KR)

(72) Inventors: Sungjong Seo, Daejeon (KR); Seung Hun Yang, Daejeon (KR); Hyunju Cho, Daejeon (KR); Keu Yeun Park, Daejeon (KR); Jungeun Yeo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 919 days.

(21) Appl. No.: 17/051,058

(22) PCT Filed: Oct. 31, 2019

(86) PCT No.: PCT/KR2019/014619
§ 371 (c)(1),
(2) Date: Oct. 27, 2020

(87) PCT Pub. No.: WO2020/091467
PCT Pub. Date: May 7, 2020

(65) Prior Publication Data
US 2021/0230463 A1 Jul. 29, 2021

(30) Foreign Application Priority Data

Nov. 2, 2018 (KR) .................. 10-2018-0133859
Oct. 29, 2019 (KR) .................. 10-2019-0135680

(51) Int. Cl.
*C09J 133/08* (2006.01)
*C09J 4/06* (2006.01)
*C09J 11/06* (2006.01)

(52) U.S. Cl.
CPC .............. *C09J 133/08* (2013.01); *C09J 4/06* (2013.01); *C09J 11/06* (2013.01); *C09J 2301/312* (2020.08)

(58) Field of Classification Search
CPC ... C09J 133/08; C09J 4/06; C09J 11/06; C09J 2301/312
USPC ........................................................ 526/319
See application file for complete search history.

(56) References Cited

U.S. PATENT DOCUMENTS

| 6,031,038 | A  | * | 2/2000 | Baumstark | ............ C08F 291/00 524/460 |
| 6,586,510 | B1 |   | 7/2003 | Brown et al. | |
| 9,243,171 | B2 | * | 1/2016 | Guo | ..................... C08L 23/0869 |
| 9,353,298 | B2 | * | 5/2016 | Ha | ........................... C09J 11/06 |
| 2012/0213992 | A1 |   | 8/2012 | Gerst et al. | |
| 2013/0202886 | A1 |   | 8/2013 | Gerst et al. | |
| 2014/0142238 | A1 | * | 5/2014 | Guo | ....................... C09J 133/14 524/521 |
| 2015/0344746 | A1 | * | 12/2015 | Ha | ........................... C09J 7/385 524/747 |
| 2018/0230340 | A1 | * | 8/2018 | Guo | ......................... C09J 7/385 |
| 2020/0017725 | A1 | * | 1/2020 | Lee | ........................ C09J 133/14 |

FOREIGN PATENT DOCUMENTS

| CN | 104769061 A | 7/2015 | |
| CN | 105247002 A | 1/2016 | |
| CN | 106459711 A | 2/2017 | |
| CN | 106459712 A | 2/2017 | |
| CN | 108350329 A | 7/2018 | |
| JP | 2002532611 A | 10/2002 | |
| JP | 2007039607 A | 2/2007 | |
| JP | 2007100009 A | 4/2007 | |
| KR | 20140045883 A | 4/2014 | |
| KR | 20150100684 A | 9/2015 | |
| KR | 20160036835 A | 4/2016 | |
| KR | 20180030563 A | 3/2018 | |
| KR | 20180073333 A | 7/2018 | |
| KR | 20180073333 A1 | * | 7/2018 |
| KR | 20180075307 A | 7/2018 | |
| KR | 20180076004 A | 7/2018 | |
| TW | 201428071 A | 7/2014 | |
| WO | 2002044296 A2 | 6/2002 | |
| WO | 2005105429 A1 | 11/2005 | |
| WO | 2016024729 A1 | 2/2016 | |
| WO | WO-2016024729 A1 | * | 2/2016 | ............ C09J 133/08 |
| WO | 2018141399 A1 | 8/2018 | |
| WO | WO-2018141399 A1 | * | 8/2018 | ............ C08F 212/08 |

OTHER PUBLICATIONS

Huo et al. "An Investigation of the Emulsion Terpolymerization of 2-Ethylhexylacrylate-Vinyl Acetate-Acrylic Acid", Journal of Applied Polymer Science, vol. 35, 1409-1420, (Year: 1988).*
International Search Report for Application No. PCT/KR2019/014619, mailed Feb. 20, 2020, pp. 1-2.
Search Report for Chinese Application No. 201980026506.0 dated Nov. 22, 2021. 3 pgs.
Extended European Search Report for Application No. 19877968.8, dated Apr. 14, 2021, 15 pages.
Huo B P et al: "An Investigation of the Emulsion Terpolymerization of 2-E thylhexylacrylate-Vinyl Acetate-Acrylic Acid", May 5, 1988 (May 5, 1988).

* cited by examiner

*Primary Examiner* — Michael M. Bernshteyn
(74) *Attorney, Agent, or Firm* — Lerner David LLP

(57) ABSTRACT

A method for preparing an aqueous acrylic pressure-sensitive adhesive for clothing is provided, which maintains aging peel strength even when stored at a high temperature for a long time and has greatly improved residue properties when the adhesive is removed from clothing fabrics, and the like. An aqueous acrylic pressure-sensitive adhesive for clothing including the composition prepared as above is also provided.

11 Claims, No Drawings

METHOD FOR PREPARING AQUEOUS PRESSURE-SENSITIVE ADHESIVE COMPOSITION FOR CLOTHING

CROSS-REFERENCE TO RELATED APPLICATIONS

The present application is a national stage entry under 35 U.S.C. § 371 of International Application No. PCT/KR2019/014619 filed on Oct. 31, 2019, which claims priority to Korean Patent Applications No. 10-2018-0133859 filed on Nov. 2, 2018 and No. 10-2019-0135680 filed on Oct. 29, 2019 with the Korean Intellectual Property Office, the disclosures of which are incorporated herein by reference in their entirety.

TECHNICAL FIELD

The present disclosure relates to a method for preparing an aqueous pressure-sensitive adhesive composition for clothing which maintains aging peel strength even when stored at a high temperature for a long time and has greatly improved residue properties when the adhesive is removed from clothing fabrics, and the like.

BACKGROUND

Recently, sticker-type surface finishing materials such as interior/exterior materials of buildings, interior design materials, advertising materials, and the like to which a pressure-sensitive adhesive (PSA) is applied have been increasingly used. Conventional oil-based adhesives incur discharge of residual solvents into air for a long period of time after construction, and thus residents of buildings suffer symptoms such as headache, eye, nose and throat irritation, cough, itching, dizziness, fatigue, reduction in concentration, and the like and, when exposed to such residual solvents for a long period of time, suffer sick house syndrome that causes respiratory ailments, heart disease, cancer, and the like.

For such reasons, aqueous emulsion pressure-sensitive adhesives, which use water as a dispersion medium, are environmentally friendly, and do not discharge harmful materials, have received much attention and are rapidly replacing the conventional oil-based adhesives. Such aqueous emulsion pressure-sensitive adhesives may use polymers having higher molecular weight than that of solvent-based polymers because a viscosity of the adhesive is not related to a molecular weight of the polymer, and may have broad concentration ranges of solid content. In addition, they may have low ageing resistance, low viscosity, and good adhesive strength in a low solid content region, and have good compatibility with other polymers.

However, due to the use of water as a solvent, such aqueous emulsion adhesives have a slow drying rate, low adhesive strength to hydrophobic adhesive surfaces and non-porous materials, narrow selection ranges of curing agents, and deteriorated initial adhesive strength. In addition, they include an emulsifier and a dispersant and thus have no superior physical properties (e.g., low water resistance) to those of oil-based adhesives. In particular, the aqueous pressure-sensitive adhesive for clothing is difficult to have good adhesive properties because a lot of dust is attached to the clothing fabric itself, and it is more often attached to the fabric than the label after adhesion. In particular, it is necessary to develop a pressure-sensitive adhesive which is cleanly removed from the substrate while having excellent adhesive strength to the clothing fabric. However, since these two properties are opposite to each other, if one of them becomes higher, the other one falls, so that both properties cannot be satisfied at the same time.

In addition, the pressure-sensitive adhesive is easily exposed to high-temperature and high-humidity environment in the process of shipping and moving in an export container after being attached to the clothing substrate. In this process, there is a problem that the adhesive is strongly adhered to the clothing. In the case of conventional aqueous pressure-sensitive adhesives for clothing, the aging peel strength is rapidly increased to about 3 times to about 5 times the initial peel strength, thereby causing damages to the clothing.

DETAILED DESCRIPTION OF THE INVENTION

Technical Problem

The present disclosure is to provide a method for preparing an aqueous pressure-sensitive adhesive composition for clothing having greatly improved residue properties, in which the adhesive remains on the fabric substrate for clothing when the adhesive is removed therefrom, while maintaining high physical properties because of its excellent adhesive strength to clothing fabrics itself even when stored at a high temperature for a long time.

The present disclosure is also to provide an aqueous acrylic pressure-sensitive adhesive for clothing including the composition prepared as described above.

Technical Solution

According to one embodiment of the present disclosure, there is provided a method for preparing an aqueous pressure-sensitive adhesive composition for clothing, including the step of emulsion polymerizing a monomer mixture including a (meth)acrylic acid ester-based monomer containing a C1 to C14 alkyl group and at least one comonomer selected from the group consisting of a vinyl ester-based monomer, a styrene-based monomer, a (meth)acrylic acid-based monomer, and a monomer represented by the following Chemical Formula 1 in the presence of an emulsifier, wherein in the monomer mixture, the (meth)acrylic acid-based monomer is included in an amount of 0.1 wt % to 2.5 wt %, and the monomer represented by the following Chemical Formula 1 is included in an amount of 0.1 wt % to 0.3 wt %, the emulsifier includes a first emulsifier which a sodium polyoxyethylene alkyl ether sulfate-based compound containing a C1 to C14 alkyl group and at least one second emulsifier selected from the group consisting of a diaryl oxide disulfonate-based compound containing a C6 to C20 aryl group, a dialkyl sodium sulfosuccinate-based compound containing a C1 to C14 alkyl group, and a sodium alkyl sulfate-based compound containing a C1 to C14 alkyl group, provided that the second emulsifier includes at least one of the diaryl oxide disulfonate-based compound and the sodium alkyl sulfate-based compound, and the emulsifier is used in 0.5 parts by weight to 1.6 parts by weight based on 100 parts by weight of the monomer mixture, and the second emulsifier is used in a weight ratio of 0.3 to 0.6 based on a weight of the first emulsifier.

[Chemical Formula 1]

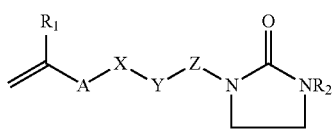

In Chemical Formula 1, $R_1$ and $R_2$ are the same as or different from each other, and are each independently hydrogen or a C1 to C10 alkyl group, A is —$CH_2$—O—, —(C=O)—O—, or —(C=O)—$NR_3$—, X is a single bond or a C1 to C10 alkylene group, wherein at least one hydrogen of the alkylene group is substituted with a hydroxy group, Y is a single bond, an oxygen atom, or —$NR_4$—, and Z is a single bond or a C1 to C10 alkylene group; X and Y are one single bond; or X, Y, and Z are one single bond, $R_3$ is hydrogen or a C1 to C10 alkyl group, and $R_4$ is hydrogen or a C1 to C10 alkyl group.

According to another embodiment of the present disclosure, there is provided an aqueous acrylic pressure-sensitive adhesive for clothing, including the composition prepared by the method.

Advantageous Effects

In the present disclosure, a monomer composition and an emulsifier composition are optimized and used together in the process of polymerizing an aqueous pressure-sensitive adhesive resin for clothing. Therefore, the adhesive resin may maintain physical properties equal to or higher than those of the conventional and exhibit stable residue properties when removed along with effective adhesion on clothing fabrics even when stored at a high temperature for a long time.

DETAILED DESCRIPTION OF THE EMBODIMENTS

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the method for preparing an aqueous pressure-sensitive adhesive composition for clothing and the aqueous acrylic pressure-sensitive adhesive for clothing including the same will be described in more detail.

In the present disclosure, a monomer composition and an emulsifier composition are optimized and used together in the process of polymerizing latex for an aqueous pressure-sensitive adhesive composition for clothing, that is, an acrylic emulsion resin. Therefore, the adhesive resin may maintain physical properties equal to or higher than those of the conventional and exhibit stable residue properties when removed along with effective adhesion on clothing fabrics even when stored at a high temperature for a long time.

Specifically, the method for preparing an aqueous pressure-sensitive adhesive composition for clothing according to an embodiment of the present disclosure is characterized in that an acrylic emulsion resin is prepared by including the step of emulsion polymerizing a monomer mixture including a (meth)acrylic acid ester-based monomer containing a C1 to C14 alkyl group and at least one comonomer selected from the group consisting of a vinyl ester-based monomer, a styrene-based monomer, a (meth)acrylic acid-based monomer, and a monomer represented by the following Chemical Formula 1 in the presence of an emulsifier, wherein in the monomer mixture, the (meth)acrylic acid-based monomer is included in an amount of 0.1 wt % to 2.5 wt %, and the monomer represented by the following Chemical Formula 1 is included in an amount of 0.1 wt % to 0.3 wt %, the emulsifier includes a first emulsifier which a sodium polyoxyethylene alkyl ether sulfate-based compound containing a C1 to C14 alkyl group and at least one second emulsifier selected from the group consisting of a diaryl oxide disulfonate-based compound containing a C6 to C20 aryl group, a dialkyl sodium sulfosuccinate-based compound containing a C1 to C14 alkyl group, and a sodium alkyl sulfate-based compound containing a C1 to C14 alkyl group, provided that the second emulsifier includes at least one of the diaryl oxide disulfonate-based compound and the sodium alkyl sulfate-based compound, and the emulsifier is used in 0.5 parts by weight to 1.6 parts by weight based on 100 parts by weight of the monomer mixture, and the second emulsifier is used in a weight ratio of 0.3 to 0.6 based on a weight of the first emulsifier.

[Chemical Formula 1]

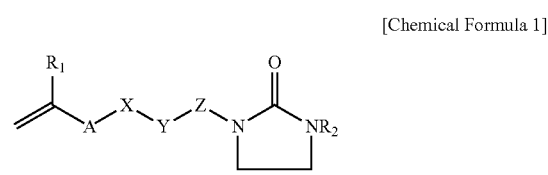

In Chemical Formula 1, $R_1$ and $R_2$ are the same as or different from each other, and are each independently hydrogen or a C1 to C10 alkyl group, A is —$CH_2$—O—, —(C=O)—O—, or —(C=O)—$NR_3$—, X is a single bond or a C1 to C10 alkylene group, wherein at least one hydrogen of the alkylene group is substituted with a hydroxy group, Y is a single bond, an oxygen atom, or —NR$_4$—, and Z is a single bond or a C1 to C10 alkylene group; X and Y are one single bond; or X, Y, and Z are one single bond, R$_3$ is hydrogen or a C1 to C10 alkyl group, and R$_4$ is hydrogen or a C1 to C10 alkyl group.

In particular, the method according to one embodiment of the present disclosure is characterized by using a (meth) acrylic acid-based monomer and the monomer of Chemical Formula 1 of the comonomer used with a (meth)acrylic acid ester-based monomer in a specific composition range, and using at least one second emulsifier selected from the group consisting of a diphenyl oxide disulfonate-based compound, a dioctyl sodium sulfosuccinate-based compound, and a sodium lauryl sulfate-based compound together with a first emulsifier which is a sodium polyoxyethylene lauryl ether sulfate-based compound in a specific composition range as an emulsifier during polymerization.

For reference, "parts by weight" as used herein refers to a relative concept of a ratio of the weight of the remaining material based on the weight of a specific material. For example, in a mixture containing 50 g of material A, 20 g of material B, and 30 g of material C, the amounts of material B and C based on 100 parts by weight of material A are 40 parts by weight and 60 parts by weight, respectively.

On the other hand, "wt % (% by weight)" refers to an absolute concept of expressing the weight of a specific material in percentage based on the total weight. In the above-described mixture, the contents of material A, B and C based on 100% of the total weight of the mixture are 50%, 20% and 30% by weight, respectively.

In addition, in the present disclosure, the (meth)acrylate includes both acrylate and methacrylate.

Specifically, the emulsifier is used for the initial particle generation, the size control of resulting particles and the stability of particles during polymerization of the monomer mixture. In the present disclosure, the emulsifier includes at least one compound selected from the group consisting of a diaryl oxide disulfonate-based compound containing a C6 to C20 aryl group, a dialkyl sodium sulfosuccinate-based compound containing a C1 to C14 alkyl group, and a sodium alkyl sulfate-based compound containing a C1 to C14 alkyl group, together with a sodium polyoxyethylene alkyl ether sulfate-based compound (various types depending on the EO group) containing a C1 to C14 alkyl group. That is, two or more compounds are used as the emulsifier, for example, by mixing at least one of a first emulsifier and at least one of a second emulsifier.

In addition, the second emulsifier should contain at least one of the diaryl oxide disulfonate-based compound and the sodium alkyl sulfate-based compound in terms of ensuring excellent coating properties while increasing adhesion properties through effective mutual compatibility between an interface of clothing fabrics and the adhesive composition.

The emulsifier should be used in an amount of about 0.5 parts by weight to about 1.6 parts by weight based on 100 parts by weight of the monomer mixture. The emulsifier should be used in an amount of at least about 0.5 parts by weight in terms of coatability, specifically at least about 0.5 parts by weight, at least about 0.6 parts by weight, at least about 0.7 parts by weight, at least about 0.8 parts by weight, or at least about 0.9 parts by weight. In addition, the emulsifier should be used in an amount of about 1.5 parts by weight or less in terms of preventing deterioration of physical properties such as initial tack force and peel strength since the emulsifier may interfere with adhesion when it is distributed on a coating surface after drying the resulting latex, that is, the acrylic emulsion resin. Specifically, it may be used in an amount of about 1.55 parts by weight or less, about 1.5 parts by weight or less, about 1.3 parts by weight or less, or about 1.2 parts by weight or less.

In addition, the second emulsifier may be used in a weight ratio of about 0.3 to about 0.6 based on a weight of the first emulsifier, specifically, in a weight ratio of about 0.4 to about 0.55, or in a weight ratio of about 0.425 to about 0.535. The weight ratio of the second emulsifier should be about 0.3 or more based on a weight of the first emulsifier in terms of particle size, and about 0.6 or less in terms of water solubility, and if it is more than that, the second emulsifier is not dissolved in water and becomes cloudy.

Preferably, the first emulsifier may be used in an amount of about 0.5 parts by weight to about 1.1 parts by weight, about 0.6 to about 1.05 parts by weight, or about 0.65 parts by weight to about 1 parts by weight, based on 100 parts by weight of the monomer mixture. The total amount of the second emulsifier may be about 0.2 parts by weight to about 0.6 parts by weight, about 0.25 parts by weight to about 0.55 parts by weight, or about 0.3 parts by weight to about 0.5 parts by weight, based on 100 parts by weight of the monomer mixture.

For example, the emulsifier may include about 0.8 parts by weight to about 1.1 parts by weight of the sodium polyoxyethylene alkyl ether sulfate-based compound containing a C1 to C14 alkyl group, about 0.1 parts by weight to about 0.25 parts by weight of the diaryl oxide disulfonate-based compound containing a C6 to C20 aryl group, and about 0.2 parts by weight to about 0.35 parts by weight of the dialkyl sodium sulfosuccinate-based compound containing a C1 to C14 alkyl group; about 0.8 parts by weight to about 1.1 parts by weight of the sodium polyoxyethylene alkyl ether sulfate-based compound containing a C1 to C14 alkyl group, and about 0.4 parts by weight to about 0.6 parts by weight of the diaryl oxide disulfonate-based compound containing a C6 to C20 aryl group; or about 0.5 parts by weight to about 0.8 parts by weight of the sodium polyoxyethylene alkyl ether sulfate-based compound containing a C1 to C14 alkyl group, and about 0.2 parts by weight to about 0.4 parts by weight of the sodium alkyl sulfate-based compound containing a C1 to C14 alkyl group; based on 100 parts by weight of the monomer mixture.

More specifically, the emulsifier may include about 1 parts by weight of the sodium polyoxyethylene alkyl ether sulfate-based compound containing a C1 to C14 alkyl group, about 0.2 parts by weight of the diaryl oxide disulfonate-based compound containing a C6 to C20 aryl group, and about 0.3 parts by weight of the dialkyl sodium sulfosuccinate-based compound containing a C1 to C14 alkyl group; about 1 parts by weight of the sodium polyoxyethylene alkyl ether sulfate-based compound containing a C1 to C14 alkyl group, and about 0.5 parts by weight of the diaryl oxide disulfonate-based compound containing a C6 to C20 aryl group; or about 0.65 parts by weight to 0.7 parts by weight of the sodium polyoxyethylene alkyl ether sulfate-based compound containing a C1 to C14 alkyl group, and about 0.3 parts by weight of the sodium alkyl sulfate-based compound containing a C1 to C14 alkyl group; based on 100 parts by weight of the monomer mixture.

Meanwhile, the first emulsifier is sodium polyoxyethylene alkyl ether sulfate containing a C1 to C14 alkyl group, that is, an alkyl group having 1 to 14 carbon atoms, and is not limited as long as it is a material known in the art. For example, the sodium polyoxyethylene alkyl ether sulfate-based compound may be a compound containing a C8 to C14 alkyl group, and preferably be a sodium polyoxyethylene lauryl ether sulfate-based compound.

The diaryl oxide disulfonate-based compound of the second emulsifier is a diaryl oxide disulfonate-based compound containing a C6 to C20 aryl group, that is, an aryl group having 6 to 20 carbon atoms, and is not limited as long as it is a material known in the art. For example, the diaryl oxide disulfonate-based compound may be a compound containing a C6 to C20 aryl group, and preferably be diphenyl oxide disulfonate.

The dialkyl sodium sulfosuccinate-based compound of the second emulsifier is a dialkyl sodium sulfosuccinate-based compound containing a C1 to C14 alkyl group, that is, an alkyl group having 1 to 14 carbon atoms, and is not limited as long as it is a material known in the art. For example, the dialkyl sodium sulfosuccinate-based compound may be a compound containing a C8 to C14 alkyl group, and preferably be a dioctyl sodium sulfosuccinate-based compound.

The sodium alkyl sulfate-based compound of the second emulsifier is a sodium alkyl sulfate-based compound containing a C1 to C14 alkyl group, that is, an alkyl group having 1 to 14 carbon atoms, and is not limited as long as it is a material known in the art. For example, the sodium alkyl sulfate-based compound may be a compound containing a C8 to C14 alkyl group, and preferably be a sodium lauryl sulfate-based compound.

For example, the emulsifier may include about 0.8 parts by weight to about 1.1 parts by weight of sodium polyoxyethylene lauryl ether sulfate, about 0.1 parts by weight to about 0.25 parts by weight of diphenyl oxide disulfonate, and about 0.2 parts by weight to about 0.35 parts by weight of a dioctyl sodium sulfosuccinate-based compound; about 0.8 parts by weight to about 1.1 parts by weight of sodium polyoxyethylene lauryl ether sulfate, and about 0.4 parts by weight to about 0.6 parts by weight of diphenyl oxide disulfonate; or about 0.5 parts by weight to about 0.8 parts by weight of sodium polyoxyethylene lauryl ether sulfate, and about 0.2 parts by weight to about 0.4 parts by weight of sodium lauryl sulfate; based on 100 parts by weight of the monomer mixture.

More specifically, the emulsifier may include about 1 parts by weight of sodium polyoxyethylene lauryl ether sulfate, about 0.2 parts by weight of diphenyl oxide disulfonate, and about 0.3 parts by weight of a dioctyl sodium sulfosuccinate-based compound; about 1 parts by weight of sodium polyoxyethylene lauryl ether sulfate, and about 0.5 parts by weight of diphenyl oxide disulfonate; or about 0.65 parts by weight to about 0.7 parts by weight of sodium polyoxyethylene lauryl ether sulfate, and about 0.3 parts by weight of sodium lauryl sulfate; based on 100 parts by weight of the monomer mixture.

Meanwhile, the monomer mixture which is polymerized in the presence of the emulsifier described above includes a (meth)acrylic acid ester-based monomer containing a C1 to C14 alkyl group and at least one comonomer selected from the group consisting of a vinyl ester-based monomer, a styrene-based monomer, a (meth)acrylic acid-based monomer, and a monomer represented by the following Chemical Formula 1.

As used herein, the term "monomer mixture" refers to one or more monomers described below, based on acrylic monomers, are mixed together. Since the one or more monomers may be added together, or sequentially added to each other, the preparation method thereof is not limited.

The (meth)acrylic acid ester monomer is a (meth)acrylic acid ester monomer containing a C1 to C14 alkyl group, that is, an alkyl group having 1 to 14 carbon atoms, and there is no limitation as long as it is a material known in the art. For example, the (meth)acrylic acid ester monomer may be at least one selected from the group consisting of methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, n-amyl (meth)acrylate, isoamyl (meth)acrylate, n-hexyl (meth)acrylate, n-heptyl (meth)acrylate, n-octyl (meth)acrylate, t-octyl (meth)acrylate, n-ethylhexyl (meth)acrylate, 2-ethylhexyl (meth)acrylate, decyl (meth)acrylate, isodecyl (meth)acrylate, tridecyl (meth)acrylate, isostearyl (meth)acrylate, phenyl (meth)acrylate, benzyl (meth)acrylate, dodecyl (meth)acrylate, cyclohexyl (meth)acrylate, lauryl (meth)acrylic, Ceryl (meth)acrylate, glycidyl (meth)acrylate, and stearyl (meth)acrylate, and these may be used in combination of two or more thereof. Specifically, one or two or more selected from methyl (meth)acrylate, ethyl (meth)arylate, butyl (meth)acrylate and 2-ethylhexyl (meth)acrylate may be preferably used.

The (meth)acrylic acid ester monomer may be included in an amount of about 55 wt % to about 99.8 wt %, about 58 wt % to about 99 wt %, or about 62 wt % to about 97 wt % based on the total amount of the monomer mixture. When the (meth)acrylic acid ester monomer is included in less than about 55 wt %, initial tack force may not be sufficient and thus the adhesive composition may not be attached to clothes. In addition, when the (meth)acrylic acid ester monomer is included in more than about 99.8 wt %, the residue of the adhesive is largely generated to adherend during removal after use, and washability is deteriorated, which is not preferable.

In a more preferred embodiment of the present disclosure, methyl (meth)acrylate of the (meth)acrylic acid ester monomer may be included in about 5 to 20 wt % based on the total amount of the monomer mixture, and the remaining (meth)acrylic acid ester monomer such as butyl (meth)acrylate and 2-ethylhexyl (meth)acrylate may be included in about 30 to 50 wt % based on the monomer mixture. In particular, when only the monomer containing a long chain alkyl group such as butyl (meth)acrylate and 2-ethylhexyl (meth)acrylate is used, a glass transition temperature (Tg) of the acrylic emulsion resin becomes very low and soft polymers are formed, resulting in a large amount of residue. Thus, a proper composition of monomers and comonomers is required. In particular, since physical properties of the adhesive are a result of the glass transition temperature (Tg) of the acrylic emulsion resin, the content ratio of each monomer and comonomer becomes important. It is desirable to adjust the ratio of the remaining monomers to obtain suitable adhesive properties.

The monomer mixture further includes at least one comonomer selected from the group consisting of a vinyl ester-based monomer, a styrene-based monomer, a (meth)acrylic acid-based monomer, and a monomer represented by the following Chemical Formula 1 together with the (meth)acrylate-based monomer. As described above, the comonomers may be added together, or sequentially added to each other, and thus the preparation method thereof is not limited.

However, the present disclosure is characterized in that the (meth)acrylic acid-based monomer of the comonomer used together with the (meth)acrylic acid ester-based monomer is used in about 0.1 to about 2.5 wt %, and the monomer represented by the Chemical Formula 1 is used in about 0.1 to about 0.3 wt %, to maintain aging peel strength even when stored under high temperature and high humidity conditions for a long time while maintaining adhesive and residue properties. Specifically, the (meth)acrylic acid-based monomer may be used in about 0.2 to about 2 wt %, about 0.5 to about 1.8 wt %, or about 0.7 to about 1.5 wt %, and the monomer represented by the Chemical Formula 1 may be used in about 0.15 to about 0.25 wt %, or 0.18 to about 0.23 wt %.

The (meth)acrylic acid-based monomer may be at least one selected from the group consisting of maleic anhydride, fumaric acid, crotanic acid, itaconic acid, and (meth)acrylic acid, and these may be used alone or in combination of two or more thereof.

The (meth)acrylic acid-based monomer should be used in about 0.1 wt % or more to improve holding power, internal bonding, and molecular weight, and in about 2.5 wt % or less in terms of preventing aging peel strength from being significantly increased even when stored at a high temperature for a long time.

In addition, the monomer represented by Chemical Formula 1 contains an ethyleneurea-based substituent or an N-(2-(2-oxoimidazolidin-1-yl)-based substituent with a terminal allyl substituent, thereby effectively forming internal crosslinking.

In Chemical Formula 1, the alkyl group in the definition of the substituents $R_1$, $R_2$, $R_3$, and $R_4$ may be linear or branched, and may have 1 to 10 carbon atoms. According to one embodiment, the alkyl group has 1 to 6 carbon atoms. According to another embodiment, the alkyl group has 1 to 4 carbon atoms. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, decyl, 1-ethyl-propyl, 1,1-dimethyl-propyl, isohexyl, 2-methylpentyl, 4-methylhexyl, 5-methylhexyl, and the like, but the present disclosure is not limited thereto.

In addition, in the Chemical Formula 1, the above description about the alkyl group may be applied to the alkylene in the definition of the substituents X and Y except that the alkylene is a divalent group.

Specifically, $R_1$ and $R_2$ may each independently be hydrogen or methyl.

Specifically, A may be —$CH_2$—O—, —(C=O)—O—, —(C=O)—NH—, or —(C=O)—$NCH_3$—.

Specifically, X may be a single bond or a C2 to C5 alkylene group, wherein one of hydrogens of the alkylene group may be substituted with a hydroxy group. For example, X may be a 2-hydroxy butylene group.

Specifically, Y may be a single bond, an oxygen atom, —NH—, or —$NCH_3$—.

Specifically, Z may be a single bond or a C1 to C6 alkylene group, and may be, for example, an ethylene group.

Alternatively, X and Y may be one sing bond, or X, Y, and Z may be one single bond.

For example, the monomer represented by the Chemical Formula 1 may be at least one selected from the group consisting of methacrylamidoethyl ethyleneurea, methacrylate ester ethyleneurea, allyl ether ethyleneurea, and N-(2-(2-oxoimidazolidin-1-yl)ethyl)(4-allyl ether)(3-hydroxy) butylamine, and these may be used alone or in combination of two or more thereof. Specifically, methacrylic amidoethyl ethylene urea may be used.

The monomer represented by the Chemical Formula 1 should be included in about 0.1 wt % or more in terms of molecular weight, and in about 0.3 wt % or less in terms of physical properties. In particular, when the monomer represented by the Chemical Formula 1 is used in less than about 0.1 wt %, a large amount of residue is generated because the monomer promotes internal crosslinking. When used in excess of about 0.3 wt %, the residue is improved, but initial tack force and peel strength are reduced by more than half.

In addition, examples of the comonomers include a vinyl ester-based monomer and a styrene-based monomer.

The vinyl ester-based monomer may include vinyl acetate, ethylene vinyl acetate, and ethylene acid vinyl acetate, but the present disclosure is not limited thereto. Herein, the vinyl ester-based monomer may be included in about 0 to about 35 wt %, or about 10 wt % to about 25 wt % based on the monomer mixture.

The styrene-based monomer may include styrene, and alpha(α)-methylstyrene, but the present disclosure is not limited thereto. Herein, the styrene-based monomer may be included in about 0 to about 5 wt %, or about 0 to about 3 wt % based on the monomer mixture.

Meanwhile, the comonomer may be added in an amount of about 0.2 wt % to 45 wt %, about 0.1 wt % to 42 wt %, or about 3 wt % to 38 wt % based on the monomer mixture. When the comonomer is included in excess of about 45 wt %, it may be excessively hardened to cause a decrease in adhesion. However, when too little comonomer is included, the adhesive is too flexible and excessive adhesive properties may appear to cause residues. Thus, it is preferable that the comonomer is included in about 0.2 wt % or more.

For example, the monomer mixture may include about 45 wt % to about 70 wt % of 2-ethylhexyl acrylate (2-EHA), about 0 to about 40 wt % of butyl acrylate (BA), about 0 to about 25 wt % of methyl methacrylate (MMA), about 0 to about 40 wt % of vinyl acetate (VAc), about 0 to about 10 wt % of styrene (SM), about 0.1 to about 2.5 wt % of acrylic acid (AA), and about 0.1 to 0.3 wt % of the monomer represented by the Chemical Formula 1.

In the present disclosure, the monomer mixture including the (meth)acrylic acid ester-based monomer and at least one comonomer is characterized in that a sum of the contents of each component is 100 wt %.

According to one embodiment of the present disclosure, the monomer mixture may include about 45 wt % to about 70 wt % of 2-ethylhexyl acrylate (2-EHA), about 30 wt % to about 40% of vinyl acetate (VAc), about 0.1 wt % to about 2.5 wt % of acrylic acid (AA), and about 0.1 wt % to about 0.3 wt % of the monomer represented by the Chemical Formula 1, and the emulsifier may include about 0.8 parts by weight to about 1.1 parts by weight of sodium polyoxyethylene lauryl ether sulfate, about 0.1 parts by weight to about 0.25 parts by weight of diphenyl oxide disulfonate, and about 0.2 parts by weight to about 0.35 parts by weight of dioctyl sodium sulfosuccinate; or about 0.8 parts by weight to about 1.1 parts by weight of sodium polyoxyethylene lauryl ether sulfate and about 0.4 parts by weight to about 0.6 parts by weight of diphenyl oxide disulfonate, based on 100 parts by weight of the monomer mixture.

According to another embodiment of the present disclosure, the monomer mixture may include about 45 wt % to about 70 wt % of 2-ethylhexyl acrylate (2-EHA), about 25 wt % to about 40% of butyl acrylate (BA), about 10 wt % to about 25 wt % of methyl methacrylate (MMA), about 0.5 wt % to about 10 wt % of styrene (SM), about 0.1 wt % to about 2.5 wt % of acrylic acid (AA), and about 0.1 wt % to about 0.3 wt % of the monomer represented by the Chemical Formula 1, and the emulsifier may include about 0.5 parts by weight to about 0.8 parts by weight of sodium polyoxyethylene lauryl ether sulfate, and about 0.2 parts by weight to about 0.4 parts by weight of sodium lauryl sulfate.

Meanwhile, according to one embodiment of the present disclosure, the monomer mixture may include an additive without particular limitation within the range that does not reduce the desired effect of the invention in addition to the above-described components. For example, the additive may include an internal crosslinking agent, a polymerization initiator, an external crosslinking agent, a buffer, a wetting agent, a neutralizing agent, a polymerization terminator, a tackifier, and the like, and may include one or two or more thereof.

The internal crosslinking agent may be at least one selected from the group consisting of allyl methacrylate, polyethylene glycol diacrylate, polycarbodiimide, allyl-N-methyl carbamate, 1,6-hexanediol diacrylate, hexanediolethoxylate diacrylate, hexanediolpropoxylate diacrylate, pentaerythritolethoxylate triacrylate, pentaerythritolpropoxylate triacrylate, vinyltrimethoxysilane, and divinylbenzene. Herein, the internal crosslinking agent may be used in an amount of about 0.2 parts by weight or less or about 0 to 0.2 parts by weight, or about 0.15 parts by weight or less or about 0.01 parts by weight to about 0.15 parts by weight, based on the monomer mixture.

As the polymerization initiator, a water-soluble polymerization initiator such as ammonium or alkali metal persulfate (ex. APS, ammonium persulfate), hydrogen peroxide, peroxide, and hydroperoxide may be used, and at least one reducing agent may be used together in order to perform the emulsion polymerization reaction at a low temperature, but the present disclosure is not limited thereto. Herein, the polymerization initiator may be used in an amount of about 1.0 parts by weight or less or about 0 to about 1.0 parts by weight, about 0.6 parts by weight or less or about 0.01 parts by weight to about 0.6 parts by weight, about 0.45 parts by weight or less or about 0.1 parts by weight to about 0.45 parts by weight, or about 0.4 parts by weight or less or about 0.5 parts by weight to about 0.4 parts by weight, based on the monomer mixture. In the polymerization of the monomer mixture, the polymerization initiator may be used by being appropriately divided one or more times within the above-mentioned range. However, when the polymerization initiator is added at the beginning of the polymerization before adding the pre-emulsion in which an emulsifier is added to the monomer mixture, the polymerization initiator is preferably added in an amount of about 0.2 parts by weight or less or about 0 to about 0.2 parts by weight, about 0.1 parts by weight or less or about 0 to about 0.1 parts by weight, or about 0.05 parts by weight or less or about 0 to about 0.05 parts by weight so as to minimize the possibility that a residue problem may occur. Preferably, the polymerization initiator may be added simultaneously with the pre-emulsion, divided or continuously over a time up to about 70% of the total polymerization time.

In addition, an external crosslinking agent, which is added later at the end of the polymerization and functions as an intercross linker for connecting polymers, may be further used in addition to the polymerization initiator. As the external crosslinking agent, diacetone acrylamide (DAAM) and adipic acid dihydrazide (ADH) may be used to design the crosslinking reaction to additionally occur externally. The external crosslinking agent is added later at the end of the polymerization and functions as an intercross linker for connecting polymers. The external crosslinking agent may be used in an amount of about 1.2 parts by weight or less or about 0 to about 1.2 parts by weight, or about 0.7 parts by weight or less or about 0.01 parts by weight to about 0.7 parts by weight, based on the monomer mixture.

The buffer may include sodium bicarbonate, sodium carbonate, sodium phosphate, sodium sulfate, sodium chloride, and the like, but the present disclosure is not limited thereto. In addition, these may be used alone or in combination of two or more thereof. The buffer may adjust the pH in the polymerization reaction and impart stability to polymerization. The buffer may be used in an amount of about 1.0 parts by weight or less or about 0 to about 1.0 parts by weight, or about 0.5 parts by weight or less or about 0.1 parts by weight to about 0.5 parts by weight, based on the monomer mixture.

The wetting agent functions as an emulsifier that lowers surface tension for coating property, and may be used within a content range well known in the art. For example, the wetting agent may be a dioctyl sodium sulfosuccinate-based compound. The wetting agent may be used in an amount of about 1.5 parts by weight or less or about 0 to about 1.5 parts by weight, or about 1.2 parts by weight or less or about 0.1 parts by weight to about 1.2 parts by weight, based on the monomer mixture.

Examples of the neutralizing agent may include NaOH, $NH_4OH$, and KOH. The neutralizing agent may be used in an amount of about 1.0 parts by weight or less or about 0 to about 1.0 parts by weight, or about 0.5 parts by weight or less or about 0.1 parts by weight to about 0.5 parts by weight, based on the monomer mixture.

In addition, the polymerization terminator is added to suppress a side reaction of radicals and residual monomers remaining after the production of latex, that is, acrylic emulsion resin, and is an additive that removes the radical to eliminate the additional reaction. The polymerization terminator may also be referred to as a radical inhibitor. It is also referred to simply as an inhibitor The polymerization terminator is used in order to stop the polymerization reaction by rapidly reacting with radicals, a polymerization initiator or a monomer, to lose characteristics of radical, or in order to preserve a monomer because the radical polymerizable monomer is naturally polymerized when left in a pure state. It is also called as a polymerization inhibitor. However, even if the inhibitor is added, when a certain amount of time passes, it is consumed in between, so that the polymerization is naturally initiated. Representative inhibitors are hydroquinone and p-tert-butylcatechol. Benzoquinone, chloranil, m-dinitrobenzene, nitrobenzene p-phenyldiamine sulfur, and the like are easily reacted with radicals and stabilized. Diphenylpicrylhydrazyl-P-fulolphenylamine and tri-P-nitrophenylmethyl which are stable radicals are also used as inhibitors. Preferably, $NaNO_2$ may be used as the polymerization terminator. The polymerization terminator may be used in an amount of about 1.0 parts by weight or less or about 0 to about 1.0 parts by weight, or about 0.5 parts by weight or less or about 0.1 parts by weight to about 0.5 parts by weight, based on the monomer mixture.

In addition, the tackifier is added with an emulsifier to further lower surface tension. In this case, a small amount of dioctyl sodium sulfosuccinate-based compound may be used to significantly lower the surface tension. The tackifier may be used in an amount of about 1.5 parts by weight or less or about 0 to about 1.5 parts by weight, about 1.2 parts by weight or less or about 0 to about 1.2 parts by weight, about 0.8 parts by weight or less or about 0 to about 0.8 parts by weight, or about 0.6 parts by weight or less or about 0.1 parts by weight to about 0.6 parts by weight, based on the monomer mixture.

Meanwhile, the monomer mixture functions as a chain transfer agent (CTA) during the polymerization reaction of the acrylic emulsion resin, and may further include a molecular weight regulator which is attached to the end of the molecule to move radicals to another place. However, since it may cause a lot of residue when used as an adhesive for clothing, almost no molecular weight regulator or a small amount thereof can be used to lower the molecular weight to improve initial tack force. For example, 3-mercaptopropionic acid, which can control the molecular weight in a small amount with a shorter length than n-DDM (1-dodecanethiol), which is well known, may be used in a very small amount. However, also in this case, there are many possibilities that a residue problem occurs, so it is preferable not to use it for the pressure-sensitive adhesive for clothing.

In order for the polymerization process to be performed smoothly, the order in which each component is added may be different. For example, additives such as a surfactant and a buffer may be first dissolved in water, followed by stirring at the beginning of the polymerization process, and then (meth)acrylic acid ester monomers and a monomer mixture of comonomers, an emulsifier and an internal crosslinking agent may be added.

In addition, the emulsion polymerization may be performed at a temperature of about 70° C. to about 90° C. for about 3 hours to about 8 hours. Considering physical properties of the adhesive, the temperature may be about 75° C. to about 85° C. In addition, the polymerization reaction may be adjusted by using a polymerization initiator alone or by mixing and using one or more of the polymerization initiator and a reducing agent. Components and contents used in the acrylic emulsion resin of the present disclosure described above may be applied without particular limitation to components such as the polymerization initiator and the reducing agent used in the polymerization reaction. In the present disclosure, a stripping process was used to remove residual monomers and water using a vacuum device. However, in recent years, the polymerization initiator is added for a longer time, thereby further performing the aging process at a high temperature to extend the reaction time. Performing the reaction at a high temperature will significantly reduce the change over time and provide a more stable product.

In the method for preparing an aqueous pressure-sensitive adhesive composition for clothing of the present disclosure, a monomer composition and an emulsifier composition are optimized and used together in the process of polymerization. Therefore, when the adhesive composition is applied as an aqueous acrylic pressure-sensitive adhesive for clothing, it may maintain physical properties equal to or higher than those of the conventional and exhibit stable residue properties when removed along with effective adhesion on clothing fabrics even when stored at a high temperature for a long time.

Aqueous Acrylic Pressure-Sensitive Adhesive for Clothing

According to another embodiment of the present disclosure, there is provided an aqueous acrylic pressure-sensitive adhesive for clothing including the composition prepared by the above method.

The aqueous acrylic pressure-sensitive adhesive according to the present disclosure may be specifically applied to an adhesive sheet for clothing. Therefore, the aqueous acrylic pressure-sensitive adhesive can be effectively applied to the fabric substrate for clothing, after which a residual rate of the adhesive can be reduced while satisfying physical properties equal to or more than the conventional when removing the adhesive. Preferably, the acrylic pressure-sensitive adhesive according to the present disclosure can reduce the residual rate of clothing fabrics to about 10% or less or about 0 to 10%, and more preferably about 8% or less or about 0 to 8%, or about 5% or less or about 0 to 5%.

The residual rate may be measured in the same manner as the analysis method of KOTITI clothing testing institute. The label sample is pressed five times with a roller having a load of about 5 kg on a selected clothing fabric, and sandwiched between glasses using a glass specimen (4 to 5 samples were laminated). Then, the attached sample is pressed with a load of about 5 kg in a thermo-hygrostat at a temperature of about 60° C. and a relative humidity of 95%, and aged for three days (a 5 kg weight was placed on the glass specimen during storage). Herein, a 100% polyester fabric, a 100% cotton fabric, or a blend fabric of 52% polyester and 48% cotton is used as the clothing fabric. The sample aged for 3 days was taken, applied with a load of about 5 kg, and then left for about 24 hours in a thermo-hygrostat (about 24° C., about 50%). Thereafter, it was taken out of the thermo-hygrostat and the label sample was removed by a 180° peel strength test using a texture analyzer. Then, the residual rate was measured by the amount of pressure-sensitive adhesive remaining on the clothing fabric substrate.

The aqueous acrylic pressure-sensitive adhesive may also have an initial tack force (loop tack) of about 7.5 N/inch to about 11.0 N/inch, or about 7.6 N/inch to about 10 N/inch. Herein, the initial tack force (loop tack) may be measured by using glass, HDPE, or bright stainless steel plate as an adherend. For example, the specimen is looped and fixed with clamps, and then attached to glass or high density polyethylene (HDPE) films at a constant rate. After about 5 seconds, the maximum force required for separation in the opposite direction at a measuring rate of about 300 mm/min is measured as loop tack peel strength. The target value may be at least about 6.0 N/inch, preferably at least about 9.0 N/inch, with respect to stainless steel plates, and at least about 2.5 N/inch, preferably at least about 3.0 N/inch, with respect to HDPE films.

The aqueous acrylic pressure-sensitive adhesive may also have peel strength (90°) of about 3.1 to 5.5 N/inch, or about 3.8 to 5.4 N/inch. The peel strength may be measured in accordance with FINAT TEST METHOD NO. 2. For example, each acrylic emulsion pressure-sensitive adhesive label specimen for clothing is attached to a stainless steel plate by reciprocating a 2 kg roller once at a rate of about 300 mm/min and aged at room temperature for about 20 minutes, and the aged adhesive label specimen is subjected to 90° peeling at a rate of about 300 mm/min using a TA Texture Analyzer. The target value may be at least about 2.4 N/inch, preferably at least about 3.0 N/inch, with respect to stainless steel plates.

The aqueous acrylic pressure-sensitive adhesive may also have holding power (shear) of about 30 minutes/0.5 inch·1 kg to about 320 minutes/0.5 inch·1 kg, about 31 min/0.5 inch·1 kg to about 200 minutes/0.5 inch·1 kg, or about 32 minutes/0.5 inch·1 kg to 150 minutes/0.5 inch·1 kg. Herein, the holding power (shear) may be measured by a holding power test (shear test). For example, a bright stainless steel plate (Bright SUS, polished and slippery) is prepared. Then, each specimen is attached to the adherend by reciprocating a 2 kg roller once, and the holding power is measured without dwell time. After a fixed load of about 1 kg is applied to the bottom of the specimen, the time at which the pressure-sensitive adhesive specimen is separated is measured. The target value may be at least 32 minutes.

Meanwhile, the aqueous acrylic pressure-sensitive adhesive according to the present disclosure is characterized in that it maintains basic physical properties and aging peel strength even when stored under high temperature and high humidity conditions for a long time. For example, aging peel strength after attachment to a stainless steel (SUS) substrate may be 5.7 N/inch or less, and aging residual rate may be 20% or less, when measured after 24 hours or more under conditions of a temperature of 50° C. and a relative humidity of 90%.

Hereinafter, the function and effect of the present invention will be described in more detail through specific examples of the present invention. □However, these examples are for illustrative purposes only, and the invention is not intended to be limited by these examples.

EXAMPLES

Example 1

Emulsion polymerization was performed by mixing the monomer mixture, the emulsifier and water as follows to prepare an acrylic adhesive pressure-sensitive composition.

Preparation of Acrylic Emulsion Resin

First, about 450 g of water was added to a 2 L glass reactor equipped with a thermometer, a stirrer, a dropping funnel, a nitrogen inlet tube and a reflux condenser, and the inside of the reactor was replaced with nitrogen while stirring. Thereafter, the temperature was raised to about 80° C. under a nitrogen atmosphere and maintained for about 60 minutes.

In a separate beaker, about 628 g of 2-ethylhexyl acrylate (2-EHA), about 350.0 g of vinyl acetate (VAc), about 20.0 g of acrylic acid (AA), and about 2 g of methacrylamidoethyl ethyleneurea (WAM) were added and mixed for about 30 minutes to prepare 1000 g of a monomer mixture.

Thereafter, about 1 g of polyethylene glycol 400 diacrylate (PEGDA, M280) as an internal crosslinking agent, and about 10 g of sodium polyoxyethylene lauryl ether sulfate as a first emulsifier were added to the monomer mixture, followed by a solution consisting of about 2 g of diphenyl oxide disulfonate, about 3 g of dioctyl sodium sulfosuccinate and about 230 g of water as a second emulsifier. Then, it was mixed with a stirrer to prepare a milky pre-emulsion The pre-emulsion prepared above and about 72 g of an about 5 wt % ammonium persulfate aqueous solution were continuously and evenly added to the 2 L glass reactor for about 5 hours. Thereafter, about 8 g of an about 5 wt % ammonium persulfate aqueous solution was further added to the reactor, and then the temperature was maintained at about 80° C. for about 2 hours to react unreacted monomers. After the emulsion polymerization reaction was completed, the resulting acrylic emulsion resin was cooled down to room temperature and the pH was adjusted to between 7 and 9 by adding an about 9 wt % aqueous ammonia solution.

Preparation of Pressure-Sensitive Adhesive Composition

A separate wetting agent was not added, but a neutralizing agent and a polymerization terminator were sequentially added and treated to the acrylic emulsion resin of which pH adjustment was completed as described above to prepare an acrylic emulsion pressure-sensitive adhesive composition.

Examples 2 and 3

An acrylic emulsion pressure-sensitive adhesive composition was prepared in the same manner as in Example 1, except that the internal crosslinking agent was not used and the contents of the monomer and emulsifier were changed as shown in Table 1.

Example 4

Emulsion polymerization was performed by mixing the monomer mixture, the emulsifier and water as follows to prepare an acrylic pressure-sensitive adhesive composition.

Preparation of Acrylic Emulsion Resin

First, about 300 g of water and 7 g of sodium polyoxyethylene lauryl ether sulfate as a first emulsifier were added to a 2 L glass reactor equipped with a thermometer, a stirrer, a dropping funnel, a nitrogen inlet tube and a reflux condenser, and the inside of the reactor was replaced with nitrogen while stirring. Thereafter, the temperature was raised to about 80° C. under a nitrogen atmosphere and maintained for about 60 minutes.

In a separate beaker, about 500 g of 2-ethylhexyl acrylate (2-EHA), about 318 g of butyl acrylate (BA), about 145 g of methyl methacrylate (MMA), about 20 g of styrene (SM), about 15 g of acrylic acid (AA), and about 2 g of N-(2-(2-oxoimidazolidin-1-yl)ethyl)(4-allyl ether)(3-hydroxy)butylamine (WAM) were added and mixed for about 30 minutes to prepare 1000 g of a monomer mixture. Thereafter, a solution consisting of about 7 g of sodium lauryl sulfate and about 230 g of water was added to the monomer mixture as a second emulsifier. Then, it was mixed with a stirrer to prepare a milky pre-emulsion About 1.2 g of sodium polyoxyethylene lauryl ether sulfate was added as a first emulsifier to the 2 L glass reactor containing the first emulsifier, and about 10 g of about 5 wt % ammonium persulfate was added thereto, followed by stirring for about 10 minutes to dissolve.

The pre-emulsion prepared above and about 80 g of an about 5 wt % ammonium persulfate aqueous solution were continuously and evenly added to the glass reactor for about 5.5 hours. Thereafter, the temperature of the reactor in which polymerization is performed was maintained at about 80° C. for about 2 hours to react unreacted monomers. After the emulsion polymerization reaction was completed, the resulting acrylic emulsion resin was cooled down to room temperature and the pH was adjusted to between 7 and 9 by adding an about 9 wt % aqueous ammonia solution.

Preparation of Pressure-Sensitive Adhesive Composition

About 10 g of dioctyl sodium sulfosuccinate was added as a wetting agent, which functions as an emulsifier that lowers surface tension for coatability, to 100 g of the acrylic emulsion resin of which pH adjustment was completed as described above, and stirred at a temperature of about 25° C. for about 60 minutes. Thereafter, a neutralizing agent and a polymerization terminator were sequentially added and treated thereto to prepare an acrylic emulsion pressure-sensitive adhesive composition.

Example 5

An acrylic emulsion pressure-sensitive adhesive composition was prepared in the same manner as in Example 4, except that the contents of the monomer and emulsifier were changed as shown in Table 1.

TABLE 1

|  |  | Example 1 | Example 2 | Example 3 | Example 4 | Example 5 |
|---|---|---|---|---|---|---|
| monomer (% by weight) | 2-EHA | 62.8 | 62.8 | 62.8 | 50 | 50 |
|  | VAc | 35 | 35 | 35 | 0 | 0 |
|  | BA | 0 | 0 | 0 | 31.8 | 31.8 |
|  | MMA | 0 | 0 | 0 | 14.5 | 15 |
|  | SM | 0 | 0 | 0 | 2 | 2 |
|  | AA | 2 | 2 | 2 | 1.5 | 1 |
|  | WAM | 0.2 | 0.2 | 0.2 | 0.2 | 0.2 |
| Internal crosslinking agent (part by weight) | M280 | 0.1 | 0 | 0 | 0 | 0 |
| External crosslinking agent (part by weight) | DAAM | 0.0 | 0.0 | 0.0 | 0 | 0 |
| Polymerization initiator (part by weight) | APS | 0/0.4 | 0/0.4 | 0/0.4 | 0.05/0.4 | 0.05/0.4 |
| First emulsifier (part by weight) |  | 1 | 1 | 1 | 0.7 | 0.65 |
| Second emulsifier-1 (part by weight) |  | 0.2 | 0.2 | 0.5 | 0 | 0 |
| Second emulsifier-2 (part by weight) |  | 0 | 0 | 0 | 0.3 | 0.3 |
| Second emulsifier-3 (part by weight) |  | 0.3 | 0.3 | 0 | 0 | 0 |

2-EHA: 2-ethylhexyl acrylate
VAC: Vinyl acetate
BA: Butyl acrylate
MMA: Methyl methacrylate
SM: Styrene
AA: Acrylic acid
WAM: Methacrylamidoethyl ethyleneurea
M280: PEGDA (Polyethylene glycol 400 Diacrylate)
DAAM: Diacetone acrylamide
APS: Ammonium persulfate
First emulsifier: Sodium polyoxyethylene lauryl ether sulfate
Second emulsifier-1: Diphenyl oxide disulfonate
Second emulsifier-2: Sodium lauryl sulfate
Second emulsifier-3: Dioctyl sodium sulfosuccinate In Table 1, the wt % represents the content of each monomer in percentage based on the total amount of the monomer mixture, and the part by weight represents the content of each monomer based on 100 parts by weight of the total amount of the monomer mixture. In addition, the content of the polymerization initiator in Table 1 includes the content added at the beginning of polymerization before adding the pre-emulsion to the monomer mixture, and the content added at the same time or after the pre-emulsion (input at the beginning of polymerization/input at the same time or after the pre-emulsion).

Comparative Example 1

An acrylic emulsion pressure-sensitive adhesive composition was prepared in the same manner as in Example 1, except that the contents and compositions of the monomer, internal crosslinking agent and emulsifier were changed as shown in Table 2, and about 3 hours after the initiation of polymerization, diacetone acrylamide (DAAM) was prepared in an about 25% aqueous solution and added as an external crosslinking agent in an amount of about 29.2 g (net weight of DAAM was about 7.3 g), which is about 0.73 parts by weight based on 100 parts by weight of the acrylic emulsion resin, that is, 100 parts by weight of the monomer mixture.

Comparative Example 2

An acrylic emulsion pressure-sensitive adhesive composition was prepared in the same manner as in Example 1, except that the internal crosslinking agent and the external crosslinking agent were not used and the contents and compositions of the monomer and emulsifier were changed as shown in Table 2.

Comparative Examples 3 and 4

An acrylic emulsion pressure-sensitive adhesive composition was prepared in the same manner as in Comparative Example 2, except that the contents and compositions of the monomer and emulsifier were changed as shown in Table 2.

Comparative Examples 5 to 8

An acrylic emulsion pressure-sensitive adhesive composition was prepared in the same manner as in Example 1, except that the contents and compositions of the monomer and emulsifier were changed as shown in Table 2.

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| monomer (% by weight) | 2-EHA | 50 | 63.3 | 62.8 | 62.3 | 63 | 62.6 | 64.8 | 60.8 |
|  | VAc | 0 | 35 | 35 | 35 | 35 | 35 | 35 | 35 |
|  | BA | 32 | 0 | 0 | 0 | 0 | 0 | 0 | 0 |
|  | MMA | 15 | 0 | 0 | 0 | 0 | 0 | 0 | 0 |
|  | SM | 2 | 0 | 0 | 0 | 0 | 0 | 0 | 0 |
|  | AA | 1 | 1.5 | 2 | 2.5 | 2 | 2 | 0 | 4 |
|  | WAM | 0 | 0.2 | 0.2 | 0.2 | 0 | 0.4 | 0.2 | 0.2 |
| Internal crosslinking agent (part by weight) | AMA | 0.03 | 0 | 0 | 0 | 0 | 0 | 0 | 0 |
| External crosslinking agent (part by weight) | DAAM | 0.73 | 0 | 0 | 0 | 0 | 0 | 0 | 0 |
| Polymerization initiator (part by weight) | APS | 0/0.4 | 0/0.4 | 0/0.4 | 0/0.4 | 0/0.4 | 0/0.4 | 0/0.4 | 0/0.4 |
| First emulsifier (part by weight) |  | 0.7 | 1.2 | 1 | 1.3 | 1 | 1 | 1 | 1 |
| Second emulsifier-1 (part by weight) |  | 0 | 0 | 0.3 | 0.7 | 0 | 0.2 | 0.2 | 0.2 |
| Second emulsifier-2 (part by weight) |  | 0.3 | 0 | 0 | 0 | 0 | 0 | 0 | 0 |
| Second emulsifier-3 (part by weight) |  | 0 | 0.5 | 0.5 | 0 | 0.5 | 0.3 | 0.3 | 0.3 |

2-EHA: 2-ethylhexyl acrylate
VAC: Vinyl acetate
BA: Butyl acrylate
MMA: Methyl methacrylate
SM: Styrene
AA: Acrylic acid
WAM: Methacrylamidoethyl ethyleneurea
M280: PEGDA (Polyethylene glycol 400 Diacrylate)
DAAM: Diacetone acrylamide
APS: Ammonium persulfate
First emulsifier: Sodium polyoxyethylene lauryl ether sulfate
Second emulsifier-1: Diphenyl oxide disulfonate
Second emulsifier-2: Sodium lauryl sulfate
Second emulsifier-3: Dioctyl sodium sulfosuccinate In Table 2, the wt % represents the content of each monomer in percentage based on the total amount of the monomer mixture, and the part by weight represents the content of each monomer based on 100 parts by weight of the total amount of the monomer mixture. In addition, the content of the polymerization initiator in Table 2 includes the content added at the beginning of polymerization before adding the pre-emulsion to the monomer mixture, and the content added at the same time or after the pre-emulsion.

Experimental Examples

Preparation of Adhesive-Coated Adhesive Specimen

Each of the pressure-sensitive adhesive compositions prepared in Examples and Comparative Examples was coated on a silicone-coated release paper, and dried in an oven at about 120° C. for about 1 minute so that a pressure-sensitive adhesive layer had a thickness of about 20 s μm. This was laminated with a polyethylene terephthalate film to prepare a label for clothing, and the label was cut to a size of 1 inch×150 mm to make a label specimen for clothing.

Adhesive properties of the label specimens for clothing using the acrylic emulsion pressure-sensitive adhesive compositions prepared in the above Examples and Comparative Examples were tested in the following manner. The results are shown in Table 3 below.

1) Initial Tack Force (Loop Tack) Test (N/Inch)
Preparation of Specimen for Loop
Specimen size: 25 mm×150 mm
Adherend: Stainless steel plate
Measuring conditions: 22±2° C., 50±5% RH
Measuring method: The specimen was looped and fixed with clamps, and then attached to glass or high density polyethylene (HDPE) films at a constant rate. After about 5 seconds, the maximum force required for separation in the opposite direction at a measuring rate of about 300 mm/min was measured as loop tack peel strength.

2) Peel Strength (N/Inch)
Peel strength of the acrylic emulsion pressure-sensitive adhesive label specimen for clothing was measured in accordance with FINAT TEST METHOD NO. 2. Specifically, each adhesive label specimen was attached to a stainless steel plate by reciprocating a 2 kg roller once at a rate of about 300 mm/min and aged at room temperature for about 20 minutes, and the aged adhesive label specimen was subjected to 90° peeling at a rate of about 300 mm/min using a TA Texture Analyzer.

3) Holding Power (Shear)
A holding power test (shear test) was performed in the following manner.
Specimen size: 25 mm×25 mm
Adherend: Bright stainless steel plate (Bright SUS, polished and slippery)
Measuring conditions: 22±2° C., 50±5% RH Measuring method: Each specimen was attached to the adherend by reciprocating a 2 kg roller once, and the holding power was measured without dwell time (measuring rate: 300 mm/min).

After a fixed load of about 1 kg was applied to the bottom of the specimen, the time at which the pressure-sensitive adhesive specimen was separated was measured.

5) SUS Aging Peel Strength and Residual Rate

After attaching the label sample to a bright stainless steel plate (SUS) substrate, it was allowed to stand in a thermo-hygrostat at a temperature of 50° C. and a relative humidity of 90% for 24 hours, and then the peel strength test and the residual rate test were performed as described above.

TABLE 3

| | Measured before SUS attachment aging test | | | | Measured after SUS attachment aging test | |
|---|---|---|---|---|---|---|
| | Loop tack (N/inch, SUS) | 90° peel (N/inch, SUS) | Shear (min, 0.5 inch · 1 kg) | Residual rate (clothing, %) | 90° peel (N/inch, SUS) | Residual rate (clothing, %) |
| Example 1 | 7.6 | 3.9 | 50 | 5-10 | 4.0 | 5-10 |
| Example 2 | 7.6 | 3.8 | 44 | 5-10 | 3.5 | 10-15 |
| Example 3 | 8.9 | 5.4 | 36 | 5-8 | 2.6 | 10-20 |
| Example 4 | 8.2 | 4.3 | 42 | 10 | 3.5 | 5 |
| Example 5 | 9.8 | 5.2 | 32 | 10 | 5.7 | 10 |
| Comp. Example 1 | 10.3 | 5.2 | 310 | 1-3 | 17.7 | 100 |
| Comp. Example 2 | 9.7 | 3.2 | 54 | Gelation | 3.0 | 20-25 |
| Comp. Example 3 | 5.6 | 3.1 | 80 | 100% residue | 2.1 | 100 |
| Comp. Example 4 | Uncoated | Uncoated | Uncoated | Uncoated | Uncoated | Uncoated |
| Comp. Example 5 | 6.5 | 4.2 | 32 | 100% residue | 2.5 | 100 |
| Comp. Example 6 | 4.0 | 2.9 | 180 | 1-5 | 12.8 | 10 |
| Comp. Example 7 | 9.9 | 5.1 | 12 | 100% residue | 3.9 | 100 |
| Comp. Example 8 | 4.1 | 3.2 | 370 | 1-5 | 3.5 | 5 |

4) Residual Rate

Specimen size: 25 mm×150 mm

Adherend: Clothing fabrics (at least 4 different types depending on fabric)

Measuring conditions: 22±2° C., 50±5% RH

Measuring method: The label sample was pressed five times with a roller having a load of about 5 kg on a selected clothing fabric, and sandwiched between glasses using a glass specimen (4 to 5 samples were laminated). Then, the attached sample was pressed with a load of about 5 kg in a thermo-hygrostat at a temperature of about 60° C. and a relative humidity of 95%, and aged for three days (a 5 kg weight was placed on the glass specimen during storage). Herein, a 100% polyester fabric, a 100% cotton fabric, or a blend fabric of 52% polyester and 48% cotton was used as the clothing fabric. The sample aged for 3 days was taken, applied with a load of about 5 kg, and then left for about 24 hours in a thermo-hygrostat (about 24° C., about 60%). Thereafter, it was taken out of the thermo-hygrostat and the label sample was removed by a 180° peel strength test using a texture analyzer. Then, the residual rate was measured by the amount of pressure-sensitive adhesive remaining on the clothing fabric substrate (size sticker test of clothing was performed in the same manner as the analysis method of KOTITI clothing testing institute). The clothing testing institute measured the residual rate and the like by observing the appearance of the adhesive with the naked eyes and the presence or absence of adhesion, damage of clothing, and color change of clothing by hand.

Referring to Table 3, Examples 1 to 5 confirmed that the holding power was improved by increasing the degree of crosslinking to improve the clothing residue and to obtain excellent aging peel strength after attachment to a stainless steel (SUS) substrate, which is SUS peel strength over time.

On the other hand, Comparative Example 1 had a problem in that the aging peel strength after attachment to a stainless steel (SUS) substrate, which is SUS peel strength over time, and aging residual rate were as large as 100%. In Comparative Example 2, as the molecular weight of the acrylic emulsion resin was too high, storage stability of the pressure-sensitive adhesive composition was remarkably decreased, resulting in gelation, and the residual rate could not be measured at room temperature. In addition, the SUS residual rate over time was as large as 20% to 25%. In Comparative Example 3, a large amount of clothing residue occurred, and the SUS residual rate over time according to the aging test as well as the residual rate measured at room temperature without the aging test appeared to reach 100%, which is not preferable. In addition, Comparative Example 4 was difficult to prepare a pressure-sensitive adhesive sheet, because the coatability became poor as the surface tension of the acrylic emulsion resin increased, and the pressure-sensitive adhesive composition was not properly applied to the release paper.

In Comparative Example 5, the degree of crosslinking was lowered and the holding power was greatly reduced, resulting in excessive residue. On the other hand, in Comparative Example 6, the adhesive properties were reduced to 50% or less than before while the degree of crosslinking was greatly increased.

In Comparative Example 7, it can be seen that the adhesive properties were improved, but the holding power was decreased, the residual rate was increased, and the stability with water was not good, thereby greatly decreasing the polymerization stability. On the other hand, Comparative Example 8 may not only have poor adhesive properties, but also may cause a problem in which a gelation phenomenon occurs due to a large increase in viscosity during polymerization.

The invention claimed is:

1. A method for preparing an aqueous pressure-sensitive adhesive composition for clothing, comprising:
emulsion polymerizing a monomer mixture in the presence of an emulsifier,
wherein the monomer mixture comprises:
a (meth)acrylic acid ester containing a C1 to C14 alkyl group; and a comonomer,
wherein the comonomer comprises a (meth)acrylic acid, and a monomer represented by Chemical Formula 1, and optionally at least one of a vinyl ester, or a styrene,
wherein the (meth)acrylic acid is included in an amount of 0.1 wt % to 2.5 wt %, and the monomer represented by Chemical Formula 1 is included in an amount of 0.1 wt % to 0.3 wt %, based on a total amount of the monomer mixture,

[Chemical Formula 1]

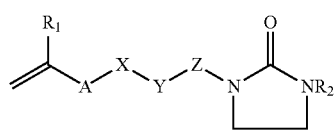

wherein,
$R_1$ and $R_2$ are the same as or different from each other, and are each independently hydrogen or a C1 to C10 alkyl group,
A is —$CH_2$—O—, —(C=O)—O—, or —(C=O)—$NR_3$—,
X is a single bond or a C1 to C10 alkylene group, wherein at least one hydrogen of the alkylene group is substituted with a hydroxy group,
Y is a single bond, an oxygen atom, or —$NR_4$—,
Z is a single bond or a C1 to C10 alkylene group,
$R_3$ is hydrogen or a C1 to C10 alkyl group, and
$R_4$ is hydrogen or a C1 to C10 alkyl group,
wherein the emulsifier comprises:
a first emulsifier and a second emulsifier,
wherein the first emulsifier is a sodium polyoxyethylene alkyl ether sulfate containing a C1 to C14 alkyl group, and
wherein the second emulsifier comprises at least one of a diaryl oxide disulfonate containing a C6 to C20 aryl group or a sodium alkyl sulfate containing a C1 to C14 alkyl group, and optionally a dialkyl sodium sulfosuccinate containing a C1 to C14 alkyl group, and
wherein a total amount of the first emulsifier and the second emulsifier is 0.5 parts by weight to 1.6 parts by weight based on 100 parts by weight of the monomer mixture, and a weight ratio of the second emulsifier to the first emulsifier is 0.3 to 0.6.

2. The method according to claim 1, wherein the first emulsifier is included in an amount of 0.5 parts by weight to 1.1 parts by weight and the second emulsifier is included in an amount of 0.2 parts by weight to 0.6 parts by weight based on 100 parts by weight of the monomer mixture.

3. The method according to claim 1, wherein the emulsifier comprises:
0.8 parts by weight to 1.1 parts by weight of the sodium polyoxyethylene alkyl ether sulfate, 0.1 parts by weight to 0.25 parts by weight of the diaryl oxide disulfonate, and 0.2 parts by weight to 0.35 parts by weight of the dialkyl sodium sulfosuccinate;
0.8 parts by weight to 1.1 parts by weight of the sodium polyoxyethylene alkyl ether sulfate, and 0.4 parts by weight to 0.6 parts by weight of the diaryl oxide disulfonate; or
0.5 parts by weight to 0.8 parts by weight of the sodium polyoxyethylene alkyl ether sulfate, and 0.2 parts by weight to 0.4 parts by weight of the sodium alkyl sulfate; based on 100 parts by weight of the monomer mixture.

4. The method according to claim 1, wherein the monomer represented by Chemical Formula 1 is at least one selected from the group consisting of methacrylamidoethyl ethyleneurea, methacrylate ester ethyleneurea, allyl ether ethyleneurea, and N-(2-(2-oxoimidazolidin-1-yl)ethyl)(4-allyl ether)(3-hydroxy)butyl amine.

5. The method according to claim 1, wherein the comonomer is included in an amount of 0.2 wt % to 45 wt % based on the total amount of the monomer mixture.

6. The method according to claim 1, wherein the monomer mixture comprises 45 wt % to 70 wt % of 2-ethylhexyl acrylate, 0 to 40 wt % of butyl acrylate, 0 to 25 wt % of methyl methacrylate, 0 to 40 wt % of vinyl acetate, 0 to 10 wt % of styrene, 0.1 wt % to 2.5 wt % of acrylic acid, and 0.1 wt % to 0.3 wt % of the monomer represented by Chemical Formula 1 based on 100 parts by weight of the monomer mixture.

7. The method according to claim 1,
wherein the monomer mixture comprises 45 wt % to 70 wt % of 2-ethylhexyl acrylate, 30 wt % to 40% of vinyl acetate, 0.1 wt % to 2.5 wt % of acrylic acid, and 0.1 wt % to 0.3 wt % of the monomer represented by Chemical Formula 1, based on the total amount of the monomer mixture, and
the emulsifier comprises 0.8 parts by weight to 1.1 parts by weight of sodium polyoxyethylene lauryl ether sulfate, 0.1 parts by weight to 0.25 parts by weight of diphenyl oxide disulfonate, and 0.2 parts by weight to 0.35 parts by weight of dioctyl sodium sulfosuccinate; or 0.8 parts by weight to 1.1 parts by weight of sodium polyoxyethylene lauryl ether sulfate and 0.4 parts by weight to 0.6 parts by weight of diphenyl oxide disulfonate, based on 100 parts by weight of the monomer mixture.

8. The method according to claim 1,
wherein the monomer mixture comprises 45 wt % to 70 wt % of 2-ethylhexyl acrylate, 25 wt % to 40% of butyl acrylate, 10 wt % to 25 wt % of methyl methacrylate, 0.5 wt % to 10 wt % of styrene, 0.1 wt % to 2.5 wt % of acrylic acid, and 0.1 wt % to 0.3 wt % of the monomer represented by Chemical Formula 1, based on the total amount of the monomer mixture, and
the emulsifier comprises 0.5 parts by weight to 0.8 parts by weight of sodium polyoxyethylene lauryl ether sulfate, and 0.2 parts by weight to 0.4 parts by weight of sodium lauryl sulfate, based on 100 parts by weight of the monomer mixture.

9. The method according to claim 1, wherein the monomer mixture further comprises an internal crosslinking agent, a polymerization initiator, an external crosslinking agent, a buffer, a wetting agent, a neutralizing agent, a polymerization terminator, or a tackifier.

10. The method of claim 1, wherein the emulsion polymerizing is performed by stirring at a temperature of 70° C. to 90° C. for 3 hours to 8 hours.

11. An aqueous acrylic pressure-sensitive adhesive for clothing, comprising the composition prepared by the method according to claim 1.

* * * * *